United States Patent
Gust et al.

(10) Patent No.: US 7,210,538 B2
(45) Date of Patent: May 1, 2007

(54) CENTER PIVOT WING FLOTATION METHOD AND APPARATUS

(75) Inventors: Jacob N. Gust, Fargo, NC (US); William A. Wake, Deer River, MN (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/810,455

(22) Filed: Mar. 27, 2004

(65) Prior Publication Data

US 2005/0211144 A1 Sep. 29, 2005

(51) Int. Cl.
*A01B 49/00* (2006.01)

(52) U.S. Cl. ............................... 172/311; 111/57

(58) Field of Classification Search ............ 172/310, 172/311, 317, 452, 456, 459, 460, 630; 56/6, 56/7, 14.7–16.3; 111/54, 56, 57
See application file for complete search history.

(56) References Cited

U.S. PATENT DOCUMENTS

| | | | |
|---|---|---|---|
| 3,866,689 A * | 2/1975 | Anderson | 172/311 |
| 4,206,815 A | 6/1980 | Hatcher | 172/311 |
| 4,383,580 A * | 5/1983 | Huxford | 172/21 |
| 4,570,722 A | 2/1986 | Osborn | 172/311 |
| 4,664,202 A | 5/1987 | Applequist et al. | 172/311 |
| 4,825,958 A * | 5/1989 | Kelderman | 172/413 |
| 4,878,545 A | 11/1989 | Dyken | 172/776 |
| 4,923,017 A | 5/1990 | Meek et al. | 172/776 |
| 5,573,070 A | 11/1996 | Meek et al. | 172/131 |
| 5,715,893 A | 2/1998 | Houck | 172/311 |
| 5,953,894 A | 9/1999 | Aron et al. | 56/367 |
| 6,003,615 A | 12/1999 | Moore | 172/456 |
| 6,123,775 A | 9/2000 | Hao et al. | 111/52 |
| 6,263,977 B1 * | 7/2001 | Mayerle et al. | 172/311 |
| 6,293,353 B1 | 9/2001 | Poole | 172/776 |
| 2003/0217537 A1 * | 11/2003 | Schlesser et al. | 56/14.9 |

* cited by examiner

*Primary Examiner*—Thomas B. Will
*Assistant Examiner*—Jamie L. McGowan
(74) *Attorney, Agent, or Firm*—Rebecca Henkel

(57) ABSTRACT

A method and apparatus for proving a flotation for the wings of a foldable wing of an agricultural seeder that are centrally suspended from the main frame such that individual wings are pivotable centrally of the longitudinal axis therefore to better follow the contours of the ground.

10 Claims, 2 Drawing Sheets

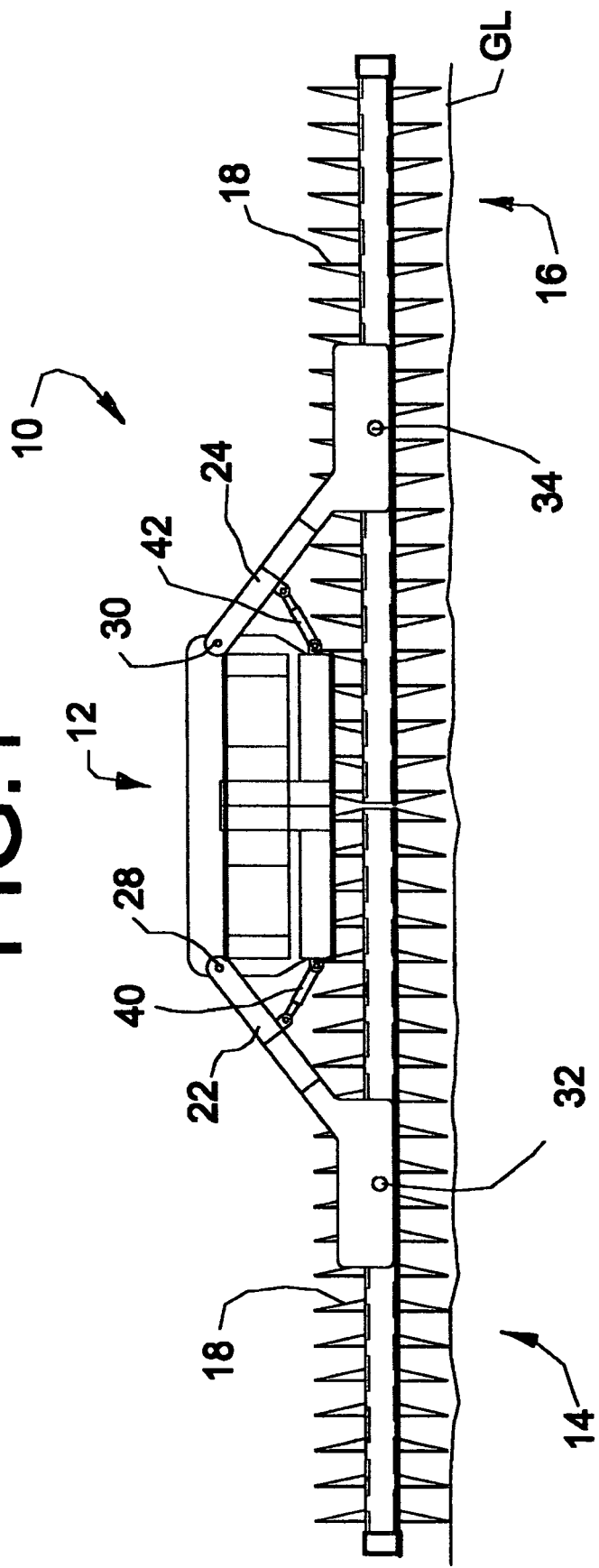

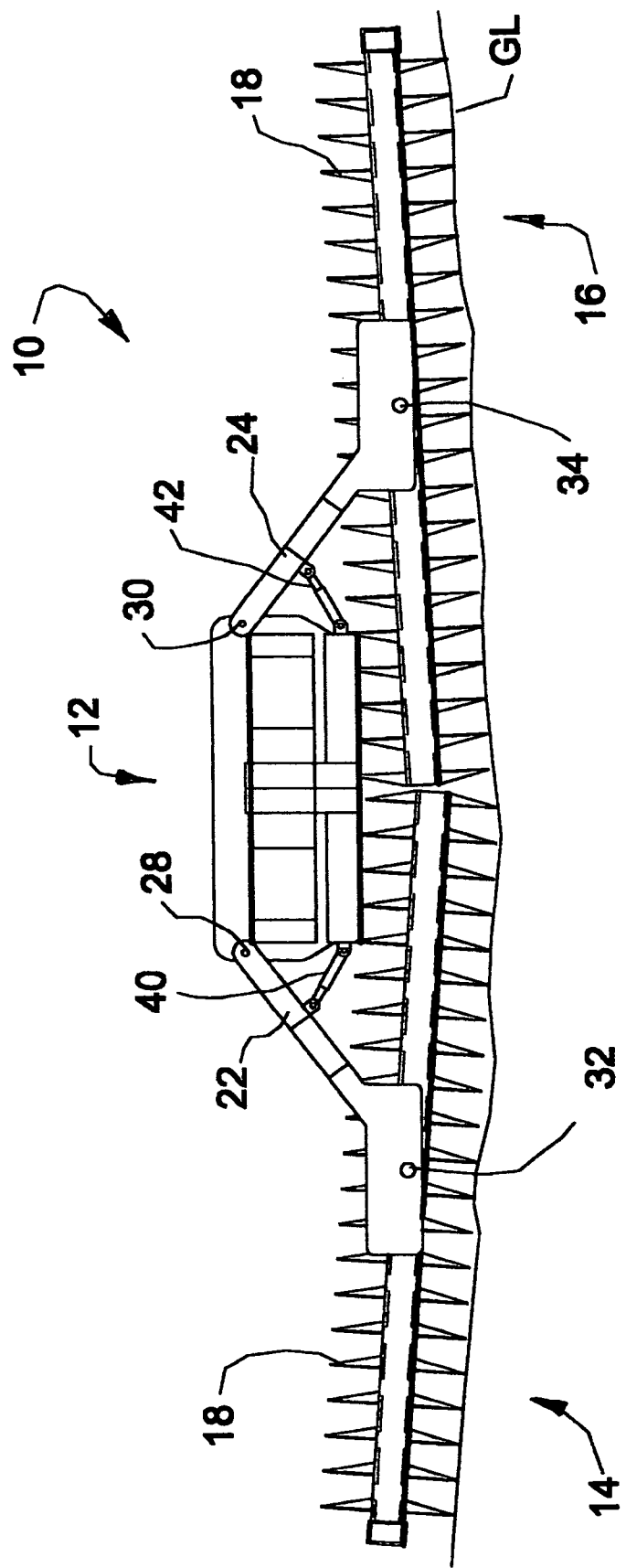

CENTER PIVOT WING FLOTATION METHOD AND APPARATUS

BACKGROUND OF THE INVENTION

The present invention relates generally to a method and apparatus for providing flotation to a wing of a multi-piece toolbar of an agricultural implement, and more particularly to such method and apparatus that employs a center pivot arrangement on the wing of an agricultural seeder.

It is well known that various agricultural implements, such as tillage equipment, seeders, and crop harvesting equipment are constructed in large part of multiple sections arranged end to end transversely to the direction of travel of the implement to provide a relatively wide operational path. Of course, in general, the wider the operational path, the more efficient and cost effective the process, and in farming as in any other business, time is money.

Most often the implement includes a main structural frame centrally mounted on its own wheel structure, and the other sections, which include toolbars and structural members, that are usually disposed at both ends of the central main frame. These other sections are in the form of wings that may be folded upward to make the overall width less and thereby place the implement in transport position. When the wing sections are in their lowered work position, they are usually carried on their own wheels or other supporting mechanisms.

In some known implements, the pivot connection which is provided between the frame of the wing and the central main frame is arranged so that a rigid connection is formed between the main frame and the wing frames when the wings are lowered to their operative positions, but such a structure has the disadvantage of causing the ground working parts of the implement to vary their relation to the ground surface as the implement passes over uneven terrain. An arrangement such as this decreases in efficiency as the width of the implement or the unevenness of the ground increases. To overcome these problems, there have been designed pivoting connections between the main frame and the frames of the wings which allow the wings to pivot relative to the main frame. These designs, too, do not provide a completely satisfactory solution to the problems, i.e., they do not accommodate ground unevenness well, because the wings only pivot about an axis located at their inner ends.

There have been other attempts at improving the flotation of implement wings, some better than others, but improved flotation has generally only resulted from designs that are complex, and expensive, and difficult to operate.

It would be advantageous to have a method and apparatus that provide flotation for the wings of an agricultural seeder that overcomes or significantly reduces the disadvantages of prior such systems, as described above.

SUMMARY OF THE INVENTION

It is an object of the instant invention to provide an improved flotation system for the wings of a ground engaging agricultural implement.

It is another object of the instant invention to provide an improved flotation method and structural arrangement for the wings of an agricultural seeder.

It is yet another object of the instant invention to provide an improved flotation system for the wings of an agricultural seeder that centrally pivots each wing from the main frame of the implement.

It is an even still further object of the instant invention to provide a flotation system for the wings of an agricultural seeder that is durable in construction, inexpensive to manufacture, carefree of maintenance, facile in assemblage, and simple and effective in use.

These and other objects and features are obtained by providing a flotation method and apparatus for a the wings of an agricultural seeder that are centrally suspended from the main frame such that individual wings are pivotable centrally of the longitudinal axis therefore to better follow the contours of the ground.

BRIEF DESCRIPTION OF THE DRAWINGS

The advantages of this invention will become apparent upon consideration of the following detailed disclosure of the invention, especially when taken in conjunction with the accompanying drawings wherein:

FIG. 1 is a rear plan view of an agricultural implement showing a central main frame with wings depending from either end thereof, sitting on level ground; and FIG. 2 is a rear plan view, similar to FIG. 1, showing flotation of the wings when the implement sits on uneven ground.

DETAILED DESCRIPTION OF THE PREFERRED EMBODIMENT

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" and "right", or "up" and "down" are used as a matter of mere convenience, and are determined by standing at the rear of the mechanism facing in its normal direction of travel. Furthermore, the various components shown or described herein for any specific application of this invention can be varied or altered as anticipated by this invention and the practice of a specific application of any element may already by widely known or used in the art by persons skilled in the art and each will likewise not therefore be discussed in significant detail.

FIG. 1 depicts a rear elevational view of a seeder 10 as it sits or moves forward along generally level ground, G1. The structure of a seeder is generally well-known in the agricultural industry, and, since no specific model or arrangement of most seeder elements is important to the present invention, only those parts necessary to impart a clear understanding of the invention are shown. For a more complete description and depiction of the various components of an exemplary seeder, attention is directed to U.S. Pat. No. 6,125,775.

Referring again to FIG. 1, the seeder 10 is shown to comprise a central main frame 12 that could be removably connected to a tractor for forward movement and as a source of hydraulic power. Main frame 12, and the majority of the constructional elements of seeder 10, are constructed primarily of steel box beams or pipes of various inside dimensions. Seeder 10 is supported above the ground, and when in the transport mode, by multiple wheels (not shown) generally symmetrically located at positions appropriate for safety and function. Two independent toolbars or wings, generally shown as 14 and 16, provide complete support for the seed-planting units (not shown), discs 18 and other necessary operational elements. As illustrated in FIG. 1, the inner ends of the wings 14, 16, are generally adjacent to each other in the working position and form a generally continuous line across the width of the seeder 10. Discs 18 and some other components of the seeding mechanism are usually supported on multiple structural members spaced horizontally from each other, though interconnected. While two wings are shown in the drawings, it is possible to support additional laterally extending wings in a manner similar to that to be described below.

Wings 14, 16 are totally supported from main frame 12 by a pair of support arms 22, 24, respectively. Support arms 22, 24, are pivotally connected at one end to the upper portion of main frame 12, respectively, by pivot pins 28, 30. The location of pivot pins 28, 30, is not necessarily high on main frame 12, though such a location permits a simplified construction. The other ends of support arms 22, 24, are pivotally affixed to respective wings 14, 16, by pivot pins 32, 34. Pins 32, 34 are located generally centrally along the length of the respective wings. By raising (hydraulically) the wheels (not shown) the distance between the ground, G1, and the wings 14, 16 may be increased sufficiently to permit the wings to be pivoted, or folded, into a transport position where they are generally at least vertically directed. Hydraulic cylinders 40, 42, which can be located in a number of positions and arrangements, raise and lower the wings.

Referring now to FIG. 2, the flotation provided by the system of the instant invention to the toolbars 14, 16 can be observed on uneven ground, G2. With the hydraulic cylinders 40, 42 locked in the lowered position, the wings are allowed to pivot about the centrally located pins 32, 34, and closely follow the contours of the ground G2. A good flotation system in a seeder assures more even plantings, with more uniform depth and germination—all important characteristics of good crop production.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. A method for providing flotation to a wing of an agricultural seeder relative to the ground, comprising the steps of:
   a) providing a wheel-supported main frame adapted to be removably affixed to a tractor for movement along the ground in a direction of travel;
   b) providing a first elongated wing with an inner end and an opposing outer end, the first wing having a longitudinal axis generally perpendicular to the direction of travel and a center point along the longitudinal axis generally equidistant from the inner and outer ends;
   c) providing a first plurality of agricultural implements affixed to the first wing and generally regularly spaced along the longitudinal axis thereof;
   d) providing a first elongated support arm pivotally affixed at one end to the main frame and at the other end to the center point of the first wing;
   e) providing a first hydraulic cylinder interconnecting directly at the first support arm and directly at the main frame such that the first cylinder can raise the first wing to a transport position and lower the first wing to a working position in contact with the ground;
   f) providing a second elongated wing with an inner end and an opposing outer end, the second wing having a longitudinal axis generally perpendicular to the direction of travel and a center point along the longitudinal axis generally equidistant from the inner and outer ends, said inner ends of said respective first and second wings being generally adjacent to each other in the working position and form a generally continuous line across the width of the seeder;
   g) providing a second plurality of agricultural implements affixed to the second wing and generally regularly spaced along the longitudinal axis thereof;
   h) providing a second elongated support arm pivotally affixed at one end to the main frame opposite the point at which the first support arm is affixed and at the other end to the center point of the second wing such that the first and second wings are on opposite side of the main frame;
   i) providing a second hydraulic cylinder interconnecting directly at the second support arm and directly at the main frame such that the second cylinder can raise the second wing to a transport position and lower the second wing to a working position in contact with the ground;
   j) lowering the first and second wings to the ground by activating the respective first and second hydraulic cylinders; and
   k) locking the first and second hydraulic cylinders in the lower position whereby the first and second wings float about the point at which the first and second support arms are pivotally affixed to the center points of the respective first and second wings,
   wherein the first and second wings are only attached to the wheel-supported main frame by the first and second support arms, respectively, so that inner and outer ends pivot freely only about the center point of each first and second wings.

2. The method of claim 1, including the step of:
   activating the first and second hydraulic cylinders at the same time to raise and lower the first and second winds in substantial unison.

3. The method of claim 1, further including the step of:
   moving the first and second elongated wings to the transport position wherein both the first and second elongated wings are generally vertically aligned.

4. An agricultural seeder comprising:
   a wheel-supported main frame with first and second opposing lateral sides and adapted to be removably affixed to a tractor for movement along the ground in a direction of travel;
   first and second elongated wings each with an inner end and an opposing outer end and each having a longitudinal axis generally perpendicular to the direction of travel and a center point along the longitudinal axis generally equidistant from the respective inner and outer ends;
   a plurality of agricultural implements affixed to the first and second wings and generally regularly spaced along the longitudinal axes thereof;
   a first elongated support arm pivotally affixed at one end to the first lateral side of the main frame and at the other end to the center point of the first wing;
   a second elongated support arm pivotally affixed at one end to the second lateral side of the main frame and at the other end to the center point of the second wing;

a first hydraulic cylinder interconnecting the first elongated support arm and the main frame such that activation of the first cylinder can raise the first wing to a transport position and lower the first wing to a working position in contact with the ground;

a second hydraulic cylinder interconnecting the second elongated support arm and the main frame such that activation of the second cylinder can raise the second wing to a transport position and lower the second wing to a working position in contact with the ground, whereby lowering and locking;

the respective inner ends of said wings being closely adjacent to each other when in the working position, forming a generally continuous line across the width of said seeder; and both the first and second hydraulic cylinders having a lock position to hold corresponding wings in the working position whereby when in the working position, the wings float relative to the ground, wherein the first and second wings are only attached to the wheel-supported main frame by the first and second support arms, respectively, so that inner and outer ends float only about the center point of each first and second wings.

5. The seeder of claim 4, further including:
a hydraulic control system connected to the first and second hydraulic cylinders to manage the activation of the cylinders.

6. The agricultural seeder as recited in claim 4, wherein the first and second wings in the transport position are generally vertically aligned.

7. In an agricultural seeder having a main frame with first and second opposing lateral sides and first and second wings pivotably attached thereto and a hydraulic control system that pivots the wings between a raised transport position and a lowered operating position in contact with the ground, the improvement comprising:

the first and second wings each with a longitudinal axis and a center point along their respective longitudinal axes, the first and second wings only pivotably attached to respective lateral sides of the main frame by a structure including first and second substantially identical support arms each having a first end pivotably attached directly at the main frame and an opposing second end pivotably attached directly at the respective wing at the center point such that the wings float only about the center point pivotally attached directly at the second end of the support arm relative to the ground;

each wing having an inner end and an outer end such that in the working position the respective longitudinal axes of the two are generally aligned, with the inner ends closely adjacent to each other thereby forming a generally continuous line along the width of the seeder;

the hydraulic control system includes a first hydraulic cylinder interconnecting the first support arm and the main frame such that activation of the first cylinder can raise the first wing to a transport position and lower the first wing to a working position in contact with the ground; and the hydraulic control system includes a second hydraulic cylinder interconnecting the second support arm and the main frame such that activation of the second cylinder can raise the second wing to a transport position and lower the second wing to a working position in contact with the ground.

8. The improvement of claim 7, further including:
a plurality of agricultural implements affixed to the first and second wings and generally regularly spaced along the longitudinal axes thereof.

9. The improvement of claim 7, wherein:
both the first and second hydraulic cylinders have a lock position to hold corresponding wings in the working position whereby when in the working position, the wings float relative to the ground.

10. The improvement of claim 7, wherein the first and second wings in the transport position are generally vertically aligned.

* * * * *